US006527722B1

United States Patent
Fazioli et al.

(10) Patent No.: US 6,527,722 B1
(45) Date of Patent: Mar. 4, 2003

(54) WIDE DYNAMIC RANGE CONTINUOUS WAVE (CW) DOPPLER RECEIVER

(75) Inventors: Theodore P. Fazioli, Salem, NH (US); Ron Gatzke, Lexington, MA (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/022,391

(22) Filed: Dec. 13, 2001

(51) Int. Cl.[7] .................................................. A61B 8/00
(52) U.S. Cl. ....................................................... 600/457
(58) Field of Search ................................ 600/457, 437, 600/443–472

(56) References Cited

U.S. PATENT DOCUMENTS 4,509,526 A * 4/1985 Barnes et al. ............... 600/456
4,866,613 A * 9/1989 Amemiya et al. .......... 600/454
5,807,259 A * 9/1998 Nakamura et al. .......... 600/457

* cited by examiner

Primary Examiner—Marvin M. Lateef
Assistant Examiner—Ruby Jain
(74) Attorney, Agent, or Firm—John Vodopia

(57) ABSTRACT

A Doppler receiver has a wide dynamic range and operates in a differential mode. In one embodiment, the invention is a wide dynamic range continuous wave (CW) Doppler receiver, comprising a differential fixed frequency output mixer configured to receive a radio frequency (RF) input signal and supply a differential signal output; a differential fixed frequency bandpass filter coupled to the differential fixed frequency output mixer and configured to provide a fixed frequency output; an in-phase mixer and a quadrature-phase mixer, each configured to receive a differential signal output of the differential fixed frequency bandpass filter; at least one in-phase filter configured to receive the output of the in-phase mixer and supply a filtered in-phase signal; at least one quadrature-phase filter configured to receive the output of the quadrature-phase mixer and supply a filtered quadrature-phase signal; and an analog-to-digital converter configured to receive the filtered in-phase signal and the filtered quadrature-phase signal and supply a corresponding in-phase digital output and a corresponding quadrature-phase digital output, the outputs of the analog-to-digital converter supplied to a memory element.

17 Claims, 4 Drawing Sheets

WIDE DYNAMIC RANGE CONTINUOUS WAVE (CW) DOPPLER RECEIVER

TECHNICAL FIELD

The invention relates generally to ultrasound imaging systems, and, more particularly, to a medical diagnostic configurable ultrasound imaging system that includes a wide dynamic range continuous wave (CW) Doppler receiver for monitoring blood flow.

BACKGROUND OF THE INVENTION

Ultrasound imaging systems have been available for quite some time and are commonly used in nondestructive testing and medical applications. Medical ultrasound imaging allows the internal structure of the human body to be viewed non-invasively in real time by transmitting ultrasound energy into the body through a transducer, and receiving ultrasound echoes reflecting from tissue and blood in the body. Because of the complex environment of the human body as a reflector of ultrasound energy, the ultrasound system contains highly sensitive processing circuitry. The ultrasound system should be able to distinguish between wanted and unwanted signals that occur simultaneously over a wide dynamic range.

Conventional ultrasound imaging systems typically are capable of many different modes of operation. For example, black and white ultrasound imaging can be used to image various internal structures of the human body that are presented to the user as a two dimensional picture of the structures. Doppler imaging is a mode of operation that allows the movement of fluid, such as blood within a vein or artery, to be imaged and displayed as a waveform that plots the velocity of the blood flow over time. The velocity of the blood flow can also be presented as an audio signal. The hardware that performs the signal processing for these imaging modes consists of both analog and digital circuitry. Analog circuitry is used where the signal-to-noise ratio, or the dynamic range, of the signals cannot tolerate the limitations imposed by digital signal processing circuitry, specifically the process of digitizing the analog signal. Once the analog processing has tailored the signals to an adequate dynamic range, the signals can be digitized. Because of the diverse nature of the various imaging modes in an ultrasound system, multiple processing paths exist to process signals having different dynamic range requirements.

Doppler imaging can be performed using either pulse wave (PW) or continuous wave (CW) techniques. PW Doppler typically involves generating and transmitting a periodic pulse wave through a transducer at a certain operating frequency that is directed to a particular location having blood flow. The signal reflecting from the moving blood is shifted in frequency by an amount proportional to the velocity of the blood flow (the "Doppler Effect"). This frequency is received by the transducer, the receiver typically being collocated with the transmitter. The direction of the blood flow can also be determined by the "sign," or relative polarity, of the frequency difference between the transmitted and received signals. The velocity of the blood flow that is sought to be measured determines the rate at which the pulse wave is transmitted. The pulses should be sent at a rate sufficient to analyze the velocity of the blood flow. Unfortunately, due to limitations in the rate at which the pulse wave can be transmitted, PW Doppler is limited in its ability to measure very high blood flow velocities. The rate limitations exist because the echoes generated by the transmitter must propagate into the body and are reflected back to the receiver before another pulse can be sent, based on the depth of the blood flow being interrogated.

CW Doppler, on the other hand, typically involves generating and transmitting a constant continuous wave signal toward the area to be imaged at a particular transducer operating frequency. The signal is continuously reflected by the blood flow, and is received by a receiver located in close proximity to the transmitter. The receiver distinguishes between the transmitted signal and the received signal by determining if there is a frequency shift between the transmitted and received signals. The movement of the blood causes this frequency shift, where the frequency shift is proportional to the velocity of the blood, and the direction of the blood flow is dependent on whether the frequency of the received signal is greater or less than the frequency of the transmitted signal. Because the signal is transmitted continuously, CW Doppler can detect significantly higher frequency shifts than PW Doppler since there is no inherent sampling rate limitation in CW mode.

Unfortunately, compared to PW Doppler ultrasound, it is more difficult for CW Doppler ultrasound to distinguish between the transmitted signal and the reflected signal that represent blood flow for two reasons. First, because the transmit signal is continuous and relatively high in amplitude, it generates interference in the receiver. Second, the echoes reflected from non-moving tissue do not contain a frequency shift, and are considered unwanted signals relative to the signals reflecting from moving blood. These sources of interference, typically called "clutter," are troublesome because the signal that represents blood flow is in general very small in magnitude when compared to the transmit signal or the echoes from stationary tissue. The wide dynamic range difference between the transmit and stationary echo signals and the reflected signal (if the reflected signal indicates blood flow) in a CW Doppler system requires that a separate analog processing path be implemented in an ultrasound imaging system that includes CW Doppler functionality.

The separate analog processing path for a CW Doppler receiver typically consists of cascaded stages of mixers and filters that detect the frequency shift of the received signal, and that filter unwanted clutter signals and unwanted high frequency components from the received signal. To support a variety of transducers, the hardware typically includes a number of programmable filters that are tuned to the operating frequencies of the available transducers. Also, the mixing stages are typically programmable in their frequencies of operation. The hardware implementation of these programmable stages typically includes costly switches and precision components.

Unfortunately, this hardware design dictates that the design be single-ended (where each signal is referenced to ground (zero (0) volts). Single-ended operation results in additional noise that may be generated by a power supply, or that appears at signal ground, being added to the received signal. This further reduces the signal-to-noise ratio and dynamic range of the received signal. Such a single-ended mode of operation can limit the performance of the receiver because common-mode noise (such as power supply noise and interference) directly affects the performance of the CW Doppler receiver.

In addition, to maximize the dynamic range of the CW Doppler processing circuitry, CW Doppler receivers typically include numerous programmable high-pass filters. These high-pass filters are commonly referred to as "wall filters," or "clutter filters" because they attempt to remove the undesired tissue echo signals from the overall received signal. Because of the limited dynamic range of typical CW ultrasound receivers, a variety of clutter filters is necessary to handle the range of clutter frequencies generated by the tissue surrounding the blood flow. These clutter filters are costly and prone to generating "mirroring artifacts" if they are not properly adjusted. Mirroring artifacts manifest themselves as the inability to determine the direction of the blood flow. The processing erroneously presents flow in both directions when mirroring occurs. In order to provide a variety of programmable clutter filters, the hardware requires costly switches and precision components, which forces the design to operate single-ended.

Further, conventional CW Doppler receivers have a limited dynamic range due to the limited dynamic range of the analog-to-digital (A/D) converters used in the signal processing path. Because of the limited dynamic range of the A/D converter, the clutter filtering that precedes the A/D converter must be much more complex, so that the signal that feeds the A/D contains as little clutter content as possible.

Therefore, it would be desirable to maximize the efficiency of the analog processing path used in a CW Doppler receiver and improve the dynamic range and sensitivity of a CW Doppler receiver.

SUMMARY OF THE INVENTION

The invention is a Doppler receiver that has a wide dynamic range and operates in a fully differential mode. In one embodiment, the invention is a wide dynamic range continuous wave (CW) Doppler receiver, comprising a differential fixed frequency output mixer configured to receive a radio frequency (RF) input signal and supply a differential signal output; a fixed frequency differential bandpass filter coupled to the fixed frequency differential output mixer, configured to provide a differential fixed frequency output; an in-phase mixer and a quadrature-phase mixer, each configured to receive a differential signal output of the differential fixed frequency bandpass filter; at least one in-phase differential low-pass filter configured to receive the output of the in-phase mixer and supply a filtered in-phase signal; at least one quadrature-phase differential low-pass filter configured to receive the output of the quadrature-phase mixer and supply a filtered quadrature-phase signal; a fixed differential high-pass clutter filter; and an analog-to-digital converter configured to receive the filtered in-phase signal and the filtered quadrature-phase signal and supply a corresponding in-phase digital output and a corresponding quadrature-phase digital output, the output of the analog-to-digital converter supplied to a memory element.

Related methods of operation and computer readable media are also provided. Other systems, methods, features, and advantages of the invention will be or become apparent to one with skill in the art upon examination of the following figures and detailed description. It is intended that all such additional systems, methods, features, and advantages be included within this description, be within the scope of the invention, and be protected by the accompanying claims.

BRIEF DESCRIPTION OF THE FIGURES

The components in the figures are not necessarily to scale relative to each other, emphasis instead being placed upon clearly illustrating the principles of the invention. Moreover, in the figures, like reference numerals designate corresponding parts throughout the different views.

DETAILED DESCRIPTION OF THE PREFERRED EMBODIMENT

The invention to be described below is applicable to ultrasound imaging systems using various types of transducers and is not limited to any particular configuration. In a preferred embodiment, the invention is implemented primarily in hardware that can include one or more software control and processing functions. The software portion can be stored in a memory and be executed by a suitable instruction execution system (microprocessor). The invention can include any or a combination of the following hardware technologies, which are all well known in the art: analog circuitry for implementing analog signal processing, such as transistors, operational amplifiers, resistors, capacitors, inductors, diodes, etc.; a discrete logic circuit(s) having logic gates for implementing logic functions upon data signals; an application specific integrated circuit having appropriate logic gates; a programmable gate array(s) (PGA); a field programmable gate array (FPGA), etc.

A portion of the software in the invention is referred to below as control and processing software. The control and processing software generally operates on the signals supplied by the hardware of the invention and comprises an ordered listing of executable instructions for implementing logical functions. The software can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM), a read-only memory (ROM), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

Figure 1:
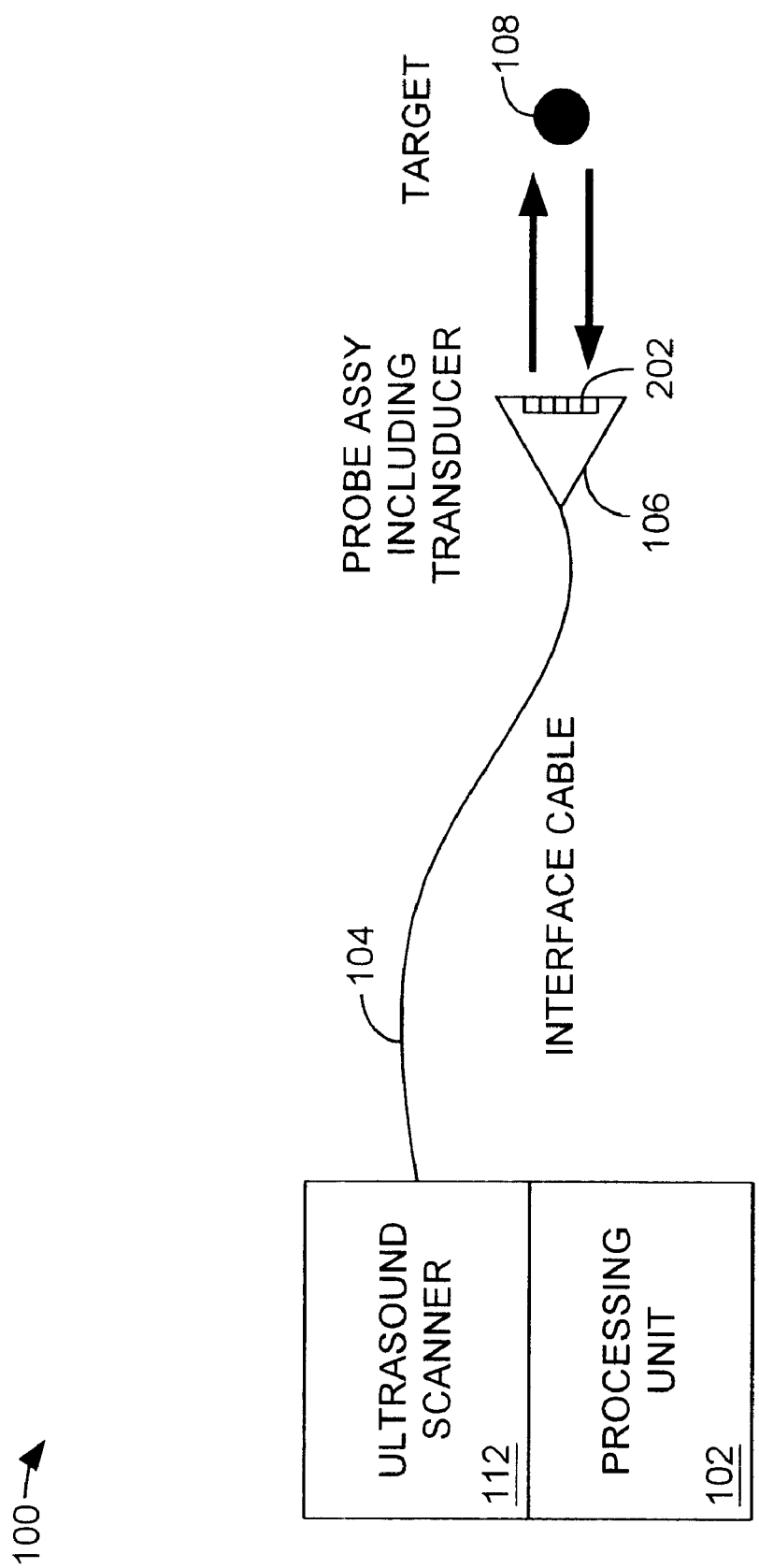
FIG. 1 is a graphical view illustrating an ultrasound system in which the invention resides.

Turning now to the drawings, FIG. 1 is a graphical view illustrating an ultrasound system 100 in which the invention resides. The ultrasound system 100 may be a conventional system as used in a medical office or hospital, or may be a compact, portable system. The ultrasound system 100 includes an ultrasound scanner 112 and a processing unit 102 connected via interface cable 104 to probe assembly 106. The probe assembly 106 includes transducer array 202, which transmits ultrasonic energy to target 108 and receives reflected ultrasonic energy from target 108. The transducer array 202 can be any of a number of different types of ultrasonic transducer arrays, including, but not limited to, a sector array, a curved array, a curvilinear array, a matrix array, or a single element, specialized CW Doppler transducer, sometimes referred to as a "pencil probe" transducer.

The transducer 202 can be used in a mode of operation referred to as CW Doppler. The CW Doppler mode is useful for detecting the flow of blood within a human- body. Processing circuitry in the ultrasound system 100 processes the received CW Doppler signals and provides both visual and audible representations of any detected blood flow. In accordance with an aspect of the invention, the novel CW Doppler processing circuitry is greatly simplified and provides wide dynamic range, improved sensitivity, and improved signal-to-noise ratio over conventional CW Doppler processing circuitry.

Figure 2:
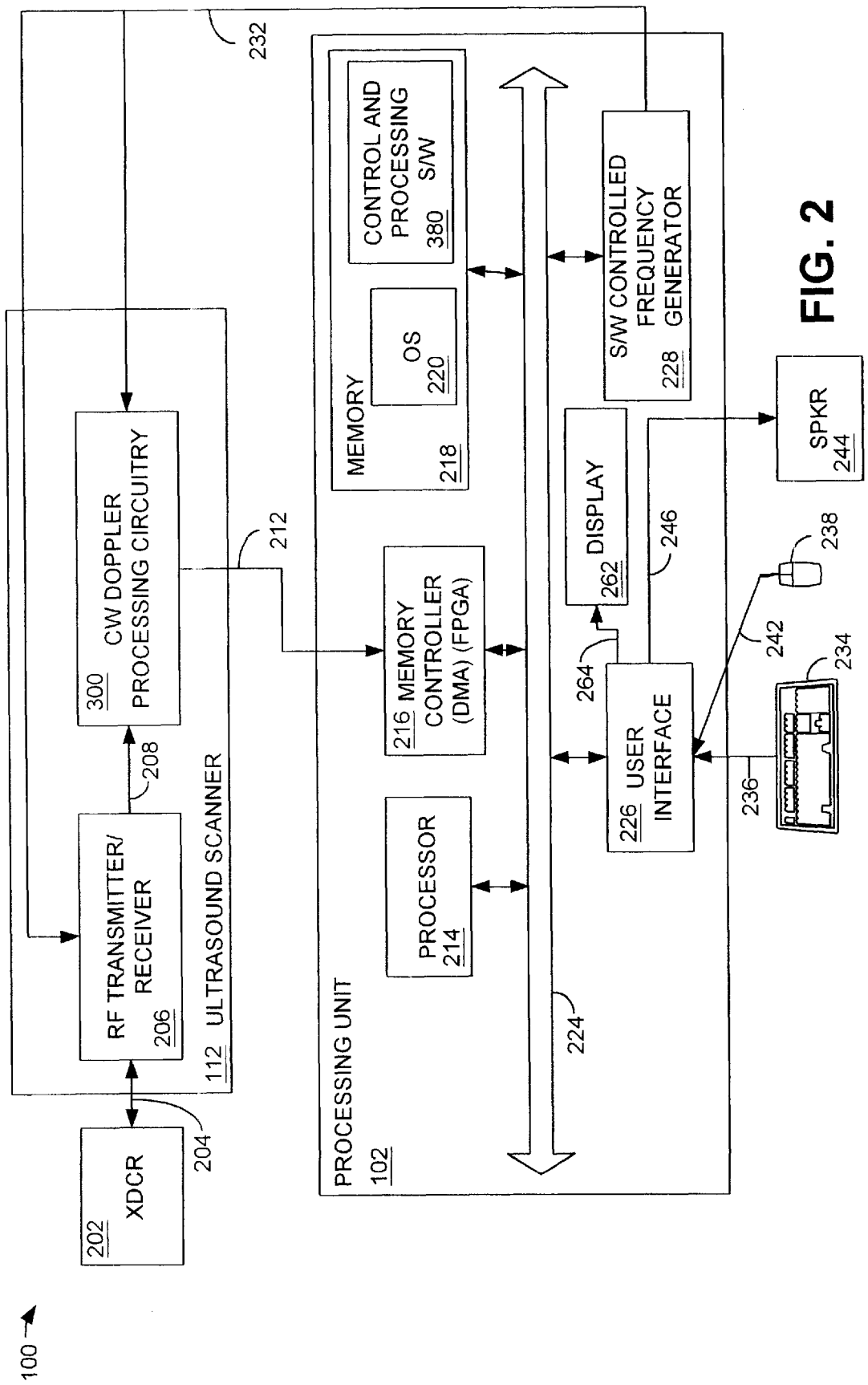
FIG. 2 is a block diagram illustrating an ultrasound system constructed in accordance with an aspect of the invention.

FIG. 2 is a block diagram illustrating an ultrasound system 100 constructed in accordance with an aspect of the invention. The ultrasound system 100 includes a transducer 202 coupled via connection 204 to the ultrasound scanner 112. The ultrasound scanner 112 includes an RF transmitter/receiver 206 and CW Doppler processing circuitry 300. The transducer 202 couples to the RF transmitter/receiver 206 via connection 204. As described above, the transducer 202 can be any commonly used and widely available transducer used with ultrasound imaging systems, or can be a specialized "pencil probe" transducer specifically designed to perform CW Doppler ultrasound imaging. The RF transmitter/receiver 206 includes circuitry (not shown) to generate, transmit and receive CW Doppler ultrasound signals.

The RF transmitter/receiver 206 is coupled to CW Doppler processing circuitry 300 via connection 208. As will be described below with reference to FIG. 3, the CW Doppler processing circuitry 300 resides in a receive signal path and operates in differential mode. The CW Doppler processing circuitry 300 uses a simplified filter arrangement, made possible in part due to the differential mode operation (to be described in detail below) and employs a high-precision analog-to-digital (A/D) converter, thereby allowing the CW Doppler processing circuitry to be greatly simplified in both structure and operation. The CW Doppler processing circuitry 300 is coupled to the processing unit 102 via connection 212 and via connection 232.

The processing unit 102 includes a processor 214, a memory controller 216, a memory element 218, a user interface 226, and a software controlled frequency generator 228 coupled together over logical interface 224. The logical interface 224 can represent one or more communication and/or signal busses, and is shown as a single interface for simplicity. The user interface 226 receives input commands from a keyboard 234 via connection 236 and/or a mouse 238 via connection 242. Further, the user interface 226 is coupled to a speaker 244 via connection 246 and to a display 262 via connection 264. The speaker 244 and the display 262 are used to provide the CW Doppler ultrasound output to a user of the system 100. As will be described in greater detail below, the flow of blood in a body, when processed by the CW Doppler processing circuitry 300, can be represented as both a visual and an audible output. Such an audible output can be provided through the speaker 244 so that a user of the ultrasound system 100, while performing CW Doppler imaging, can hear the flow of blood inside a body.

The user interface 226 is also coupled to the processor 214 over the logical interface 224. The user interface 226 can be used to change various parameters of the CW Doppler processing circuitry 300 in conjunction with software (to be described below) stored in memory 218 and executed by the processor 214.

The processor 214 executes the software that is stored in the memory 218 to allow the ultrasound system 100 to operate. Furthermore, signals received via connection 212 by the memory controller 216 from the CW Doppler processing circuitry 300 are also stored in memory 218 and processed by the processor 214.

The memory 218 includes an operating system 220 and a control and processing software element 380. The memory 218 can include any one or a combination of volatile memory elements (e.g., random access memory (RAM), such as DRAM, SRAM, etc.) and non-volatile memory elements (e.g., NVRAM, ROM, hard-drive, tape, CD ROM, etc.). Moreover, the memory 218 may incorporate electronic, magnetic, optical, and/or other types of storage media. Note that the memory 218 can have a distributed architecture, where various components are situated remote from one another, but are accessible by the processor 214.

The processor 214 executes the operating system 220 to provide the normal operating features and functions of the ultrasound system 100. The processor 214 can be any specialized or general-purpose processor capable of executing the instructions stored in the memory 218 for operating the ultrasound system 100.

The processor 214 also provides control over the logical interface 224 so that the memory controller 216 can forward the output of the CW Doppler processing circuitry 300 to the memory 218. The output of the CW Doppler processing circuitry 300, when stored in the memory 218, can be modified and adjusted by the processor 214, via commands from the control and processing software 380. For example, the control and processing software 380 can be used to adjust the gain of the displayed signal supplied by the CW Doppler processing circuitry 300, or it can be used to adjust various aspects of the manner in which information is displayed to a user, such as the velocity ranges. Software may also exist which performs analytical measurements of the spectral data that result from the CW Doppler processing.

The processing unit 102 also includes a software controlled frequency generator 228. The software controlled frequency generator 228 provides a local oscillator (LO) signal to the CW Doppler processing circuitry 300 via connection 232, and also controls the frequency at which the RF transmitter/receiver 206 operates.

Figure 3:
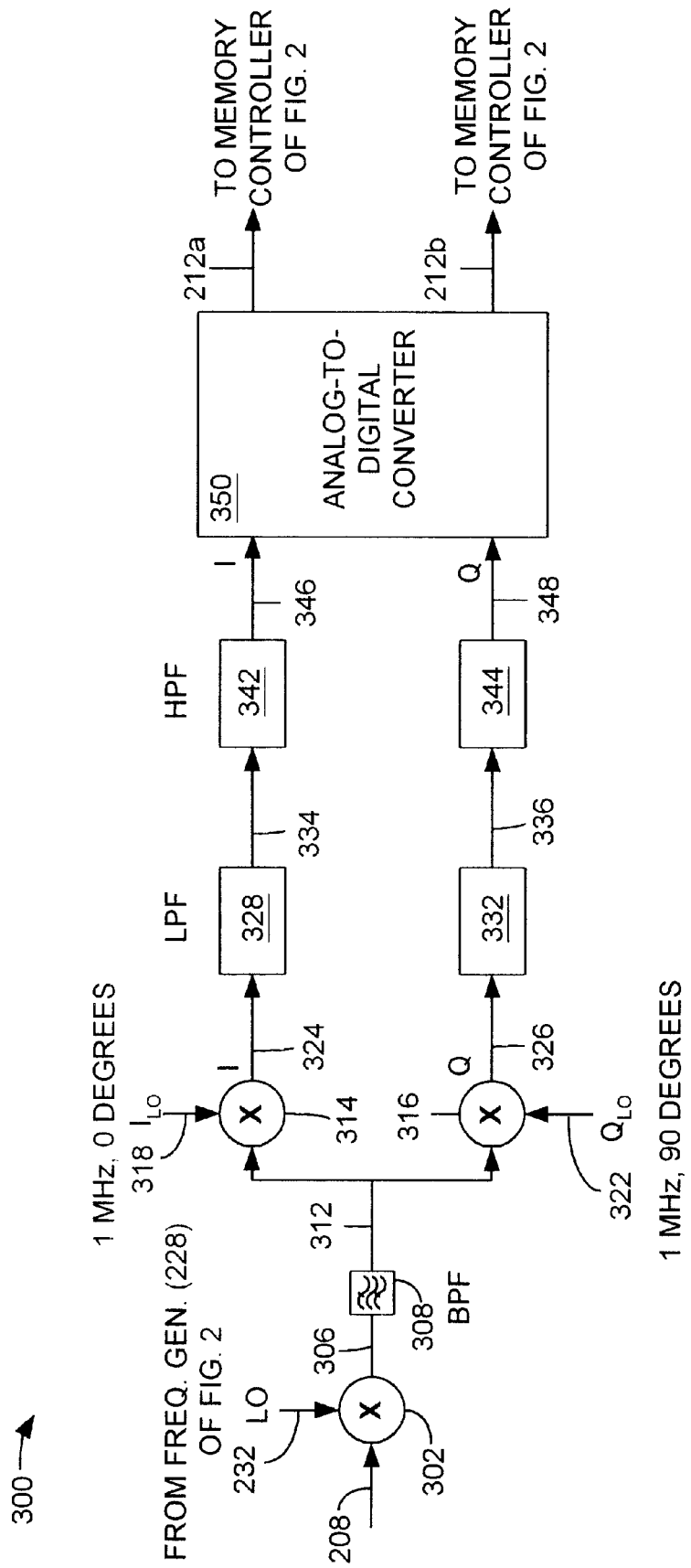
FIG. 3 is a schematic diagram illustrating the CW Doppler processing circuitry of FIG. 2.

FIG. 3 is a schematic diagram illustrating the CW Doppler processing circuitry 300 of FIG. 2. A signal that represents the received Doppler energy is supplied via connection 208 to a first mixer 302. The first mixer 302 operates in a fully differential mode. The signal on connection 208 is received from the RF transmitter/receiver 206 (FIG. 2) and is typically in the range of 2 to 8 megahertz (MHz). This signal is relatively low in frequency so that good blood flow velocity detection can be obtained during CW Doppler imaging. The Doppler signal on connection 208 and a local oscillator signal on connection 232 are supplied to the first mixer 302. The local oscillator signal is supplied from the software controlled frequency generator 228 (FIG. 2) to convert the signal on connection 208 to a constant intermediate frequency (IF) signal, regardless of the RF frequency. Preferably the frequency of the signal on connection 306 is at 1 MHz, although not restricted to 1 MHz. The frequency of the RF signal on connection 208 and the frequency of the local oscillator signal on connection 232 are chosen to result in the constant IF frequency (1 MHz in this example) output from the first mixer 302 on connection 306. By insuring that the output of the first mixer 302 will always be at a constant frequency, differential operation for the balance of the CW Doppler processing circuitry 300 can be ensured. By ensuring that fully differential operation can occur, the need for numerous and costly software controlled filters is eliminated, thereby significantly reducing the cost of the CW Doppler processing circuitry 300 with respect to a conventional processing system, as well as increasing the dynamic range and signal-to-noise ratio of the circuitry.

As a result of the operation of the first mixer 302, both a desirable constant frequency output and an undesirable mixing term appear on connection 306. Through normal operation of the first mixer 302, the difference of the RF signal on connection 208 and the LO signal on connection 232 will be provided on connection 306, and the sum of the RF signal and the LO signal will be present on connection 306. For example, if the RF signal on connection 208 is at a frequency of 3 MHz and the local oscillator signal on connection 232 is at a frequency of 2 MHz, then, due to this difference and sum effect of the first mixer 302, both a 1 MHz and a 5 MHz signal will appear on connection 306.

Therefore, to remove both the high frequency mixing component (in this example the 5 MHz signal) and any low frequency (i.e., lower than 1 MHz), a differential fixed bandpass filter 308 is employed. The differential fixed bandpass filter 308 receives the IF signal on connection 306 and provides a 1 MHz output on connection 312. Essentially, the differential fixed bandpass filter 308 eliminates any low and high frequencies from the signal on connection 306 and leaves the desirable 1 MHz signal on connection 312. Because a constant 1 MHz signal is used by the CW Doppler processing circuitry 300, the prior art bank of complex filters and switches that would be used in a conventional processing system can be replaced by the single, fixed bandpass filter 308 operating in a differential mode. By operating in differential mode, the signal-to-noise ratio, the clutter rejection, and the dynamic range of the CW Doppler processing circuitry 300 can all be improved.

The 1 MHz signal on connection 312 is supplied to a pair of mixers 314 and 316. The mixer 314 operates on the in-phase (I) component of the signal while the mixer 316 operates on the quadrature-phase (Q) component of the signal to mix the signal on connection 312 to a baseband frequency centered around DC (0 Hz). The in-phase mixer 314 receives a local oscillator (LO) signal at a frequency of 1 MHz via connection 318 and the quadrature-phase mixer 316 receives a local oscillator signal at a frequency of 1 MHz via connection 322. The local oscillator signal supplied to mixer 314 is offset in phase by 90° from the local oscillator signal supplied to the quadrature-phase mixer 316.

Through the operation of the in-phase mixer 314 and the quadrature-phase mixer 316, a pair of baseband frequencies on connections 324 and 326 are generated that are 90° out of phase with respect to each other. The signals on connections 324 and 326 are centered at DC (0 Hz), where any frequency offset from DC is the signal that represents the flow of blood and any low frequency clutter detected by the transducer 202 (FIG. 1).

The signal on connection 324 is supplied to a differential low-pass filter 328 and the signal on connection 326 is supplied to a differential low-pass filter 332. The signals on connections 324 and 326 are supplied to differential low-pass filters to remove any unwanted mixing terms introduced to the signal via the mixers 314 and 316. These undesirable mixing terms are a result of the mixers providing the sum of the frequencies of the local oscillator signal and the input on connection 312, as well as the difference of the frequencies of the signal on connection 312 and the local oscillator signal. Accordingly, the output of the low-pass filter 328 on connection 334 ideally includes only the baseband signal of the in-phase portion of the signal, and the output of the low-pass filter 332 on connection 336 includes only the baseband signal of the quadrature-phase portion of the signal. By supplying a constant (in this example, 1 MHz) signal on connection 312 (along with any frequency shift caused by the blood flow), it is possible for the low pass filters 328 and 332 to be single frequency fixed filters, instead of the multiple programmable filters in conventional processing systems. Further, the differential operation of the circuitry shown in FIG. 3 is possible because of the simple non-programmable filters employed.

The in-phase baseband signal on connection 334 is supplied to a differential high-pass filter 342 and the quadrature-phase baseband signal on connection 336 is supplied to a differential high-pass filter 344. The differential high-pass filters 342 and 344 are known as "clutter filters" or "wall filters." As mentioned above, when operating in a continuous wave (CW) mode, it is desirable to discriminate the high power, continuous transmit signal from the blood flow signal. Further, in addition to the blood flow, which is typically a very small signal, other slow moving elements near the blood flow also cause clutter. For example, the motion of heart valves and vein walls in the vicinity of the imaged blood flow contribute to clutter in the receive signal. The motion of these slow moving elements in the vicinity of the blood flow typically manifest as very low frequency (0–30 Hz) Doppler signals. Therefore, the high-pass filters 342 and 344 remove any clutter and noise occurring at or near DC frequency.

Any non-DC frequency present on connections 346 and 348 typically represents the flow of blood detected by the transducer 202. This blood flow is typically in the audible range, and can be heard by a user of the system 100 via speaker 244 (FIG. 2).

The output of the in-phase signal path on connection 346 is offset in phase by 90 degrees from the output of the quadrature-phase signal path on connection 348. The frequency of the signals on connections 346 and 348 determines the speed of the detected blood flow, while the sign of the phase difference between the two signals on connections 346 and 348 determines the direction of the blood flow.

Figure 4A:
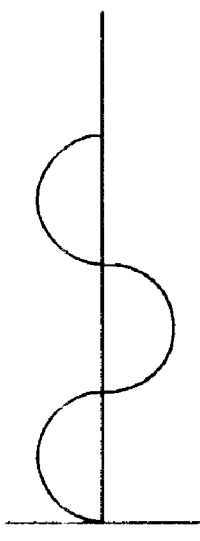
FIGS. 4A and 4B are graphical representations collectively illustrating a possible output of the in-phase mixer and the quadrature-phase mixer, respectively, of FIG. 3.
Figure 4B:
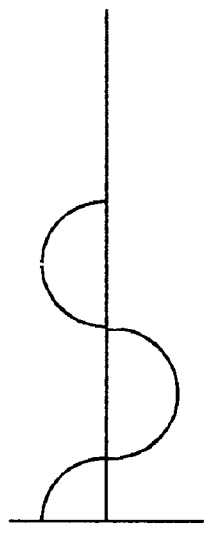

FIGS. 4A and 4B are graphical representations collectively illustrating a possible output of the in-phase signal path on connection 346 and the quadrature-phase signal path on connection 348, respectively, of FIG. 3. As shown from FIGS. 4A and 4B, the signal on connection 346 is represented by the waveform 400 and the signal on connection 348 is represented by the waveform 410. The waveform 400 is shifted in phase by 90° with respect to the waveform 410. The phase difference can determine the direction of flow in that, for example, if the output of the quadrature-phase signal path leads the output of the in-phase signal path, the blood flow is in a particular direction. If the opposite is true and the output of the in-phase signal path leads the output of the quadrature-phase signal path, then the blood flow is in the opposite direction.

As known to those having ordinary skill in the art, the signal phases shown here are arbitrary with respect to in-phase and quadrature-phase signals and can be reversed. For example, depending on the LO signals supplied to the mixers 314 and 316, the waveform shown in FIG. 4A can be the output of the quadrature-phase signal path while the waveform shown in FIG. 4B can be the output of the in-phase signal path.

Referring again to FIG. 3, a Fast Fourier Transform (FFT) of the waveform on connections 346 and 348 yields the frequency of the signals. By analyzing the frequency, the speed of the flow can be computed. Further, the direction of the blood flow can be determined by the polarity of the frequency that is computed with the FFT calculations. These computations can be performed by the processor 214 of FIG. 2.

In accordance with an aspect of the invention, the output of the in-phase signal path on connection 346 and the output of the quadrature-phase signal path on connection 348 are baseband signals where any portions of the signals that are offset in frequency from DC represent the blood flow.

The relatively clutter free in-phase baseband signal on connection 346 and the relatively clutter free quadrature-phase baseband signal on connection 348 are supplied to an analog-to-digital (A/D) converter 350. Preferably, the A/D converter 350 has a high sample rate, dual input, and is capable of operating in a differential mode. Preferably, the A/D converter is a 24-bit, 100 kilosample per second, (ks/s) differential A/D converter; however any wide dynamic range A/D converter 350 can be used. The analog-to-digital converter 350 takes the analog voltage waveform inputs on connections 346 and 348 and provides digital bit streams on connections 212a and 212b, respectively, that are digital representations of the signals on connections 346 and 348, respectively. The output on each of connections 212a and 212b is a serial binary output that represents the voltage levels on connections 346 and 348, respectively, sampled every 10 microseconds. The output of the A/D converter 350 is supplied to the memory controller 216 (FIG. 2), which then supplies the output of the A/D converter 350 to the memory element 218 (FIG. 2) for processing by the processor 214 (FIG.2).

In accordance with CW Doppler processing, the digital bit stream supplied to the memory controller 216 from the CW Doppler processing circuitry 300 is processed by the processor 214 so that both audible and visual outputs corresponding to the blood flow can be presented to a user.

The high precision A/D converter 350 allows the use of a simple, one stage, high-pass filter 342 and 344, which then allows both the high-pass filters 342 and 344 to operate differentially. As mentioned above, the differential operation of the CW Doppler processing circuitry 300 allows significantly simplified fixed frequency filters to be used in place of conventional complicated programmable filters.

The 24-bit capability of the A/D converter 350 allows the A/D converter 350 to handle an extremely wide dynamic range, such as the wide dynamic range of the signals on connections 346 and 348.

It will be apparent to those skilled in the art that many modifications and variations may be made to the preferred embodiments of the present invention, as set forth above, without departing substantially from the principles of the present invention. For example, the present invention can be used in conjunction with various ultrasonic transducer array technologies and different beamforming methodologies. Further, the present invention is not limited to the specific frequencies, sample rates and A/D converter specifications mentioned above. All such modifications and variations are intended to be included herein within the scope of the present invention, as defined in the claims that follow.

What is claimed is:

1. A wide dynamic range continuous wave (CW) Doppler receiver that operates in a fully differential mode, comprising:
   a differential fixed frequency output mixer configured to receive a radio frequency (RF) input signal and supply a differential signal output;
   a differential fixed frequency bandpass filter coupled to the differential fixed frequency output mixer and configured to provide a differential fixed frequency output;
   an in-phase mixer and a quadrature-phase mixer, each configured to receive a differential signal output of the differential fixed frequency bandpass filter;
   at least one in-phase differential low-pass filter configured to receive the output of the in-phase mixer and supply a filtered in-phase signal;
   at least one quadrature-phase differential low-pass filter configured to receive the output of the quadrature-phase mixer and supply a filtered quadrature-phase signal;
   an in-phase and quadrature-phase fixed differential high-pass clutter filter; and
   an analog-to-digital converter configured to receive the filtered in-phase signal and the filtered quadrature-phase signal and supply a corresponding in-phase digital output and a corresponding quadrature-phase digital output, the outputs of the analog-to-digital converter supplied to a memory element.

2. The Doppler receiver of claim 1, wherein the analog-to-digital converter is a high precision, 24 bit 100 kilosample per second analog-to-digital converter.

3. The Doppler receiver of claim 1, wherein the differential fixed frequency bandpass filter, the in-phase mixer, the quadrature-phase mixer, the at least one in-phase differential low-pass filter, the at least one quadrature-phase differential low-pass filter, the high-pass clutter filters, and the analog-to-digital converter operate in a differential mode.

4. The Doppler receiver of claim 1, wherein the fixed frequency output mixer provides an output at a frequency of 1 megahertz (MHz).

5. The Doppler receiver of claim 1, further comprising:
   a second filter configured to receive the output of the in-phase mixer; and
   a second filter configured to receive the output of the quadrature-phase mixer.

6. The Doppler receiver of claim 1, wherein the frequency of the filtered in-phase signal and the frequency of the filtered quadrature-phase signal correspond to movement of fluid or tissue represented by the radio frequency (RF) input signal.

7. The Doppler receiver of claim 1, wherein a sign of the phase difference of the filtered in-phase signal and the filtered quadrature-phase signal correspond to a direction of the movement of fluid or tissue represented by the radio frequency (RF) input signal.

8. The Doppler receiver of claim 1, wherein the in-phase mixer and the quadrature-phase mixer receive an 1 MHz local oscillator signal and supply a baseband output signal.

9. The Doppler receiver of claim 8, wherein the in-phase mixer and the quadrature-phase mixer supply a baseband signal the frequency of which represents blood flow or tissue movement represented by the radio frequency (RF) input signal.

10. A method for operating a wide dynamic range continuous wave (CW) Doppler receiver in a fully differential mode, comprising:

providing a radio frequency (RF) input signal to a differential fixed frequency output mixer, the differential fixed frequency output mixer configured to supply a differential signal output;

coupling a differential fixed frequency bandpass filter to the differential fixed frequency output mixer, the differential fixed frequency bandpass filter configured to provide a fixed frequency output;

providing a differential signal output of the differential fixed frequency bandpass filter to an in-phase mixer and a quadrature-phase mixer;

providing an output of the in-phase differential mixer to at least one in-phase differential low-pass filter, the in-phase differential low-pass filter configured to supply a filtered in-phase signal;

providing an output of the quadrature-phase differential mixer to at least one quadrature-phase differential low-pass filter, the quadrature-phase differential low-pass filter configured to supply a filtered quadrature-phase signal;

providing the filtered in-phase signal and the filtered quadrature-phase signal to a fixed differential high-pass clutter filter and coupling an analog-to-digital converter to the output of the in-phase high-pass clutter filter and the quadrature-phase high-pass clutter filter, the analog-to-digital converter configured to supply a corresponding in-phase digital output and a corresponding quadrature-phase digital output, the outputs of the analog-to-digital converter supplied to a memory element.

11. The method of claim 10, wherein the analog-to-digital converter is a high precision, 24 bit 100 kilosample per second analog-to-digital converter.

12. The method of claim 10, further comprising operating the differential fixed frequency bandpass filter, the in-phase mixer, the quadrature-phase mixer, the at least one in-phase differential low-pass filter, the at least one quadrature-phase differential low-pass filter, the fixed differential high-pass clutter filters, and the analog-to-digital converter in a differential mode.

13. The method of claim 10, wherein the differential fixed frequency output mixer provides an output at a frequency of 1 megahertz (MHz).

14. The method of claim 10, wherein the frequency of the filtered in-phase signal and the frequency of the filtered quadrature-phase signal correspond to movement of fluid or tissue represented by the radio frequency (RF) input signal.

15. The method of claim 10, wherein a sign of the phase difference of the filtered in-phase signal and the filtered quadrature-phase signal correspond to a direction of the movement of fluid or tissue represented by the radio frequency (RF) input signal.

16. The method of claim 10, wherein the in-phase mixer and the quadrature-phase mixer receive an 1 MHz local oscillator signal and supply a baseband output signal.

17. The method of claim 16, wherein the in-phase mixer and the quadrature-phase mixer supply a baseband signal whose frequency represents blood flow or tissue movement represented by the radio frequency (RF) input signal.

* * * * *